United States Patent [19]

Fey et al.

[11] Patent Number: 4,874,431

[45] Date of Patent: Oct. 17, 1989

[54] LOW VOLATILITY WATER REPELLENTS

[75] Inventors: Kenneth C. Fey; Alan L. Freiberg, both of Midland, Mich.; John G. Price, South Glamorgan, United Kingdom

[73] Assignee: Dow Corning Corporation, Midland, Mich.

[21] Appl. No.: 218,781

[22] Filed: Jul. 14, 1988

[51] Int. Cl.[4] .................................................. C09K 3/19
[52] U.S. Cl. ........................................ 106/2; 106/12; 106/287.13; 106/287.14; 106/287.16
[58] Field of Search ........... 106/2, 12, 287.13, 287.14, 106/287.16

[56] References Cited

U.S. PATENT DOCUMENTS

| | | | |
|---|---|---|---|
| 3,388,089 | 6/1968 | Brown | 106/287.13 |
| 3,766,123 | 10/1973 | Burnie et al. | 106/2 |
| 3,832,203 | 8/1974 | Saunders et al. | 106/287.13 |
| 4,209,432 | 6/1980 | Roth | 106/287.14 |
| 4,436,856 | 3/1984 | Huhn et al. | 106/287.13 |
| 4,478,911 | 10/1984 | Price | 106/2 |
| 4,648,904 | 3/1987 | DePasquale et al. | 106/2 |

FOREIGN PATENT DOCUMENTS 1444221 7/1976 United Kingdom .................... 106/2

Primary Examiner—Paul Lieberman
Assistant Examiner—Helene Klemanski
Attorney, Agent, or Firm—Jim DeCesare

[57] ABSTRACT

A method of reducing the volatility and decreasing the evaporation loss of water repellent compositions containing a solution of an alkylalkoxysilane and a carrier prior to application of the composition to a porous substrate by acidifying the solution in order to cause rapid equilibriation of the alkylalkoxysilane and the carrier to a constant steady state condition, adding to the acidified hydrolyzed alkylalkoxsilane solution at least one metal salt catalyst to further increase the hydrolysis rate of the alkylalkoxysilane and to complete the hydrolysis and the condensation of the alkylalkoxysilane, adding at least one surface depositing agent to the acidified hydrolyzed alkylalkoxysilane solution in order to reduce evaporation of un-reacted alkylalkoxysilane, and maintaining the solution in a substantially anhydrous condition, so that the amount of hydrolyzed silane absorbed by the porous substrate and the percentage of water excluded from the porous substrate by the repellent composition are increased.

8 Claims, 3 Drawing Sheets

LOW VOLATILITY WATER REPELLENTS

BACKGROUND OF THE INVENTION

This invention relates to a method of reducing the volatility and decreasing the evaporation loss of water repellent compositions containing a solution of an alkylalkoxysilane and a carrier, for application of the composition to a porous substrate.

Water resistance is an important factor in concrete and masonry construction. This is for the reason that moisture movement in concrete causes or contributes to problems such as expansion, shrinkage, cracking, staining, mildew, lowered resistance to freezing and thawing, chemical attack, corrosion of reinforcing steel, and damage to structures from settling. Because of these problems, various techniques have been used for water repellency including the surface treatment of concrete structures with repellents. Repellents that have been used in the past are oils, waxes, soaps, resins, and silicones, and they have been applied to the masonry surfaces by brush, roller, air spray, or airless spray techniques. One of the most prevalent category of repellent that has been used is silicones, and silicones in organic solvents have been found to be useful for brick, concrete, stucco, or terrazo surfaces. Exemplary of such prior art techniques for rendering concrete water repellent by means of silicones can be found in U.S. Pat. No. 3,772,065, issued Nov. 13, 1973, and U.S. Pat. No. 4,342,796, issued Aug. 3, 1982. A purportedly improved technique is disclosed in U.S. Pat. No. 3,879,206, issued Apr. 22, 1975, where certain additives are included with the silicones. However, in contrast to the latter patent, the technique of the present invention differs in providing for the features of reduced volatility; decreased evaporation loss; the use of a higher molecular weight carrier; the application of a catalyst in addition to a surface depositing agent; an anhydrous solution system; and a step of acidification; all of which are brought out hereinafter in more detail. While the techniques of the prior art can penetrate and thereby render surfaces water resistant, they have not to any substantial degree done anything to block the pores on the surface of the structures since as previously noted, the repellent penetrates into the structure and then cures to a resinous matrix therewithin. The result is that such products do not bead water on the masonry surface in the fashion of the oils, and while the oils do not have the longevity or the penetrating power of silane, for example, the oils are visually striking in their ability to bead and shed surface water. It should also be noted that when alcohol solutions of alkylalkoxysilanes are deposited on a porous surface such as masonry, the solution may penetrate into the porous surface of the masonry or evaporate from that same surface. As this process is occurring during application of the solution to the substrate, the hydrolysis and condensation of the silane is progressing because of the action of water and residual alkalinity in the masonry, as well as because of the presence of catalysts in the solution. However, as the silane is being chemically changed, it penetrates less and evaporates less. It has been found that losses due to evaporation may be as high as seventy to eighty percent of the original weight of silane applied to the substrate. Therefore, and in accordance with the present invention, losses due to evaporation may be reduced by employing alcohol carriers of higher molecular weight. Such alcohols exchange with the methoxy group present in the alkylalkoxysilane to yield a less volatile silane which is capable of penetration into the porous substrate. Further volatility reductions can be achieved by also including in the solution a catalyst to cause the silane to hydrolyze and condense at a more rapid rate, and by adding to the solution a high molecular weight polymer capable of depositing on the surface of the porous substrate. Improved results may be achieved by any of the preceding techniques or combinations thereof depending upon the particular application and conditions. Such disadvantages of the prior art are overcome with the present invention wherein there is provided compositions and methods in which the advantages of both the silane and the oil types of repellents are combined in order to impart to silanes the visual property and affect of water being repelled.

SUMMARY OF THE INVENTION

This invention is directed to a method of reducing the volatility and decreasing the evaporation loss of water repellent compositions containing a solution of an alkylalkoxysilane and a carrier upon application of the composition to a porous substrate by acidifying the solution in order to cause rapid equilibration of the alkylalkoxysilane and the carrier to a constant steady state condition, adding to the acidified hydrolyzed alkylalkoxysilane solution at least one metal salt catalyst to further increase the hydrolysis rate of the alkylalkoxysilane and to complete the hydrolysis and the condensation of the alkylalkoxysilane, adding at least one surface depositing agent to the acidified hydrolyzed alkylalkoxysilane solution in order to reduce evaporation of unreacted alkylalkoxysilane, and maintaining the solution in a substantially anhydrous condition, so that the amount of hydrolyzed silane absorbed by the porous substrate and the percentage of water excluded from the porous substrate by the repellent composition are increased.

This invention is also directed to a water repellent composition for porous substrates formed by combining an alkylalkoxysilane with a carrier selected from the group consisting of alcohols, mineral spirits, and glycol ethers, together with an effective amount of a surface depositing agent for producing on the surface of the porous substrate a water beading-water shedding surface coating, and a metal salt catalyst. In a preferred embodiment the water repellent is a forty percent solution of alkylalkoxysilane with $C_1$ to $C_6$ alkyl groups on silicon, or a blend of alkylalkoxysilanes each having $C_1$ to $C_6$ alkyl groups on silicon, in an alcoholic or benzine carrier, and the metal salt catalyst is tetraisopropyltitanate. In the most specific embodiment of the present invention, the composition is eighty-five percent by weight of isobutyltrimethoxysilane, ten percent by weight of tetraisopropyltitanate, and five percent by weight of dibutyltindilaurate.

The invention is further directed to a method of producing on a porous substrate an improved water beading-water shedding surface coating by applying to the porous substrate a composition formed by combining an alkylalkoxysilane with a carrier selected from the group consisting of alcohols, mineral spirits, and glycol ethers, together with an effective amount of a surface depositing agent for producing on the surface of the porous substrate the durable water beading-water shedding surface coating, and a metal salt catalyst.

It is an object of the present invention to provide a method of reducing the evaporation loss of alkylalkoxysilane solutions upon being applied to porous substrates such as masonry by a reduction in the volatility of the alkylalkoxysilane, and to provide compositions of such alkylalkoxysilane solutions of reduced volatility and hence decreased evaporation loss.

It is in addition an object of the present invention to chemically fix a water-repelling agent to a porous substrate such as concrete, limestone, and natural stone, in order to improve its resistance to the absorption of water as well as to impart to the surface thereof the ability to bead and to shed surface water.

It is a further object of the present invention to increase the cured crosslink density of a silicone matrix within a porous substrate such as concrete, limestone, and stone, as well as near its surface, in order to render the substrate water resistant, and at the same time provide it with the property of beading and shedding surface waters.

It is also an object of the present invention to provide a penetrating masonry water repellent composition for porous substrates such as concrete and limestone as well as other non-reactive masonry surfaces in which the repellent not only renders the substrate resistant to water penetration but in addition hinders the ingress of water at the surface by the process of beading.

These and other objects, features, and advantages of the herein described invention will become apparent from the following detailed description thereof wherein reference is made to the several tests, examples, and tables included therein.

DETAILED DESCRIPTION OF THE INVENTION

Figure 1:
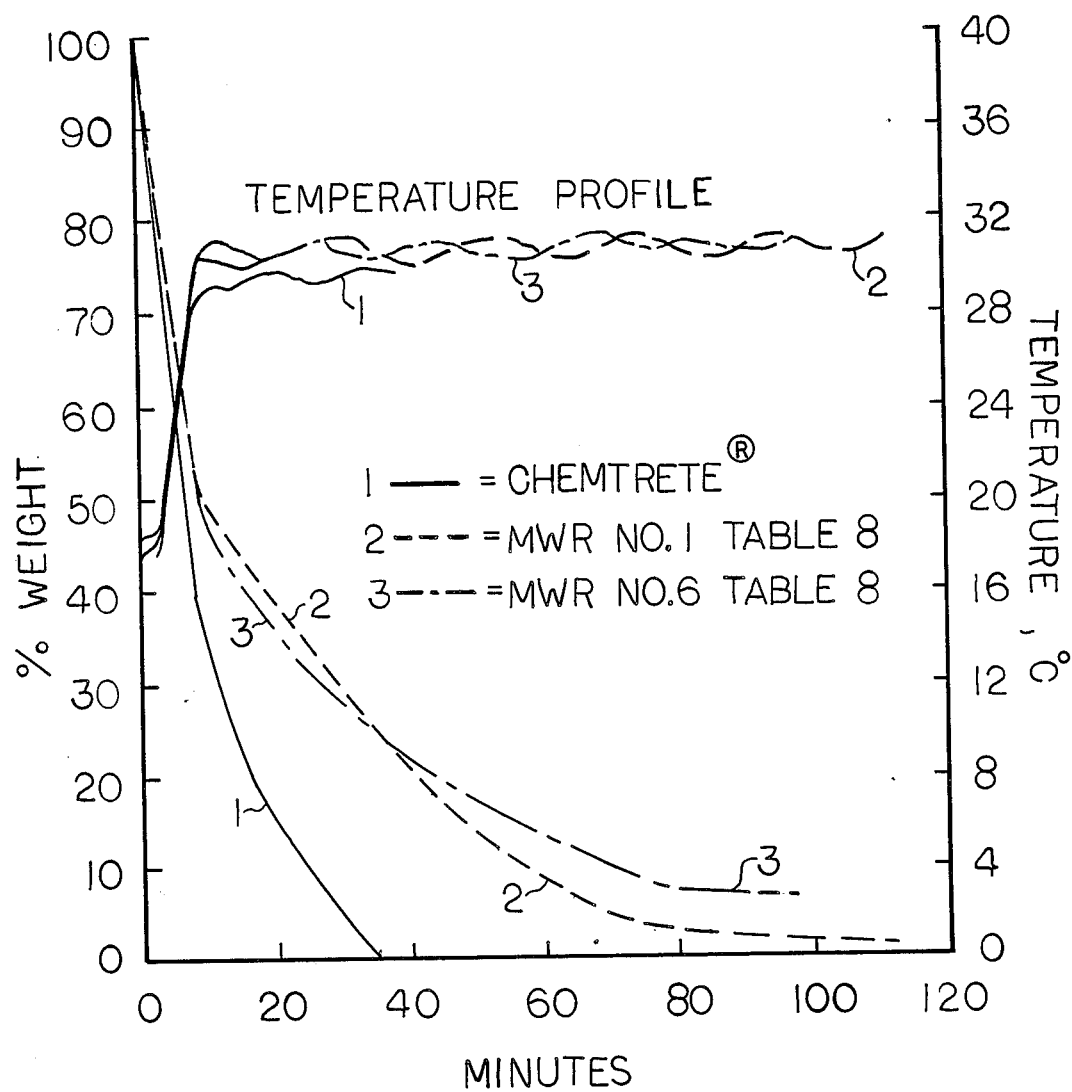
FIG. 1 is a graphical representation of an isothermal thermogravimetric analysis (TGA) of masonry water repellents (MWR) showing that ethanol based alkylalkoxysilane solutions evaporate more rapidly than isopropoxylated alkylalkoxysilane based solutions.

Masonry water repellents including alkylalkoxysilanes impart water repellent properties to such porous substrates as concrete and stone. Such category of repellent function in this fashion because of the fact that they penetrate into the masonry prior to the time that they are transformed into immobile resinous materials. However, due to the penetration of the repellent into the porous substrate, the repellent does not leave behind much of a surface layer on the porous substrate. As a result, the repellent, though effective to render the substrate water resistant, fails nevertheless to provide the substrate with a water beading coating on its surface of any significant durability. The compositions disclosed herein are intended to overcome this deficiency and by selection of appropriate materials for incorporation into the formulation, there can be achieved a good degree of water beading and water shedding function at the surface of the masonry structure because of polymer deposition on the surface of the masonry, in addition to the penetration of the repellent formulation to provide a deep section water barrier to water migration within the substrate itself.

The penetrating and water beading masonry water repellents of the present invention have particular application to the highway industry where water resistance is required for bridge decks, roads, and parking garages. In addition, such compositions are applicable especially to the building industry which makes use of masonry materials for walls such as natural stones which are porous and contain neutral mineral components including, for example, limestone, marble, and granite. These heretofore difficult to treat building materials can be effectively rendered water resistant with the compositions of the present invention because of the added benefit of the water beading and water shedding function of the formulations which contributes to an improvement in repellency. While the highway industry applications of the formulations will be primarily concrete, the building industry applications of the formulations can range from brick, natural stone as noted above, cinder block, and stucco.

Generally, concrete, brick, and stucco, may be treated with an alkylalkoxysilane rendering the substrate water resistant. The latent alkalinity of such substrates promotes the hydrolysis and condensation of the silane into a resinous silicone matrix being permanently formed and deposited within the interior of the concrete, brick, or stucco substrate. Natural stone, such as limestone, is an exception in that it is relatively neutral and possesses no latent catalytic activity. As a consequence, the silane will not convert to a silicone as rapidly, nor will it affix itself to the carbonaceous interior surfaces of the substrate. The result is that there is provided very little or no water repellency or resistance to water absorption. This problem of lack of reactivity of limestone is particularly noticeable when limestone aggregate is employed as a constituent in the preparation of concrete. In such instance, water readily penetrates along the interfacial boundaries between the concrete and the course limestone aggregate. Since the silane-based repellent does not adhere to the limestone, those portions of the concrete adjacent the aggregate are not rendered water resistant whereas the remainder of the concrete substrate is treated successfully. The water takes the path of least resistance into the mass of concrete, therefore, migrating along the side or through the aggregate of limestone particles. It is for these types of situations that the compositions of the present invention are useful along with their capacity to bead and shed water at the surface of the substrate.

The water beading-water shedding composition of the present invention includes as its basic ingredient a forty percent solution of an alkylalkoxysilane with $C_1$ to $C_6$ alkyl groups on silicon, or a blend of alkylalkoxysilanes each having $C_1$ to $C_6$ alkyl groups on silicon, in an alcoholic or benzine carrier. It is preferably isobutyltrimethoxysilane in isopropanol. Also included in the composition is tetraisopropyltitanate referred to in the Tables below as TIPT. This material is a catalyst for converting methoxysilanes to resinous products by means of hydrolysis and condensation. For example, Table 1 shows that titanates are more effective at such conversions than are other types of metal salts known to be condensation catalysts.

TABLE 1

Catalysts Screened For Hydrolysis - Condensation Of Alkyl Alkoxy Silane[1]

| Catalyst[2] | 7 HR At 25° C., 50% RH | | 96 HR at 25° C., 50% RH | |
|---|---|---|---|---|
| | WT % Metal In Silane Sample | WT % Residue: ie.[3] Hydrolyzed Silane | WT % Metal In Silane Sample | WT % Residue: ie.[3] Hydrolyzed Silane |
| None | 0.00 | 6.4 | 0.00 | 1.0 |
| Titanium | | | | |
| TBT | 0.19 | 12.6 | 0.57 | 22.9 |
| TIPT | 0.19 | 14.3 | 0.57 | 23.8 |
| TIN | | | | |
| Stannous Octoate | 0.20 | 3.4 | 0.60 | 8.4 |
| DBTDA | 0.18 | 8.4 | 0.54 | 23.3 |
| DBTDL | 0.20 | 7.1 | 0.60 | 12.3 |
| DBTDO | 0.20 | 7.1 | 0.60 | 12.4 |
| Aluminum | | | | |
| Manalox ® 30A | 0.20 | 6.6 | 0.60 | 11.8 |
| 205 | 0.20 | 7.5 | 0.60 | 10.0 |
| Alusec ™ 591 | 0.20 | 6.6 | 0.60 | 9.3 |
| 801 | 0.20 | 5.5 | 0.60 | 17.5 |
| Others | | | | |
| Manosec ® Mn16 | 0.20 | 3.4 | 0.60 | 8.1 |
| Zr18 | 0.20 | 4.7 | 0.60 | 6.3 |
| Ca10 | 0.20 | 2.3 | — | — |
| Co18 | 0.19 | 4.8 | 0.57 | 9.5 |
| Zn Octoate | 0.20 | 5.2 | 0.60 | 3.0 |
| A.F. Silane | 0.22 | 3.4 | 0.66 | 1.6 |

[1]Samples allowed to react in and/or evaporate from an open aluminum dish at 25° C., 50% RH.
[2]TBT = Tetrabutyltitanate
DBTDA = Dibutyltindiacetate
DBTDO = Dibutyltindioctoate
TIPT = Tetraisopropyltitanate
DBTDL = Dibutyltindilaurate
A.F. = Aminofunctional
[3]Avg. of 2 test values.

TABLE 1A

Confirmation of Catalyst Results Listed in Table 1.[1]

| Wt % Catalyst[2] | IBTMS[4] Conc (WT %) | Solvent | WT % Silane/Hydrolyzed Silane Remaining[3] | | |
|---|---|---|---|---|---|
| | | | 5 HR | 22 HR | 96 HR |
| 0 | 40 | IPA | 32 | 9 | Liquid State |
| 0 | 40 | Mineral Spirits | 22 | 17 | Liquid State |
| 3.5 DBTDL | 40 | IPA | 14 | 13 | Greasy Film |
| 3.5 TIPT | 40 | IPA | 27 | 25 | Dry, Hard Film |

[1]Samples allowed to react in and/or evaporate from open Petrie dishes at 50% RH, 25° C.
[2]WT % of catalyst (as supplied) in a 40% silane/solvent solution.
[3]Average value from (2) separate sets of tests.
[4]Reacidified using HCL (10 ppm).

In Table 1A there is set forth data supporting the results obtained and shown in Table 1. The titanate catalyst tetraisopropyltitanate(TIPT) yielded a dry film after ninety-six hours of ambient exposure, while the non-catalyzed sample as well as the tin-catalyzed sample, dibutyltindilaurate(DBTDL), remained liquid and semi-solid, respectively. The catalyst comparisons set forth in Tables 1 and 1A were not conducted on masonry surfaces therefore the time required in these tests to achieve a complete cure is longer than normally would be expected, for cure is accelerated on masonry because of the alkalinity of the material and its greater surface area. Yet, the foregoing data compiled from procedures wherein reactions and evaporation of isobutyltrimethoxysilane(IBTMS) in otherwise open laboratory dishes was reliable format for screening potentially viable catalyst compositions.

TABLE 2

MWR Test Solutions: Blends of MeSi(OCH$_3$)$_3$ And iBuSi(OCH$_3$)$_3$

| Solution | MeSi(OCH$_3$)$_3$ | iBuSi(OCH$_3$)$_3$ | TIPT[1] | IPA | % By WT[2] MWR Agents | % Solids of MWR Agents |
|---|---|---|---|---|---|---|
| 1 | 90.0 | 0 | 10 | 150 | 40 | 18.36 |
| 2 | 76.5 | 13.5 | 10 | 150 | 40 | 19.51 |
| 3 | 67.5 | 22.5 | 10 | 150 | 40 | 19.94 |
| 4 | 58.5 | 31.5 | 10 | 150 | 40 | 20.37 |
| 5 | 0 | 90.0 | 10 | 150 | 40 | 23.17 |

[1]Tetraisopropyltitanate
[2]Includes MTM, IBTMS, TIPT

TABLE 3

Mineral Spirits Use In A Silane-Based MWR As A Substitute For Alcohol

| Solution[1] | MTM | IBTMS | IPA | Mineral Spirits | Butyl Cellosolve ® | TIPT |
|---|---|---|---|---|---|---|
| 6 | — | 40 | 60 | — | — | — |

TABLE 3-continued

Mineral Spirits Use In A Silane-Based MWR As A Substitute For Alcohol

| Solution[1] | MTM | IBTMS | IPA | Mineral Spirits | Butyl Cellosolve ® | TIPT |
|---|---|---|---|---|---|---|
| 7 | 30 | 10 | 18 | 37 | 13 | 5 |
| 8 | — | 36 | 60 | — | — | 4 |

[1]All samples acidified with 10 ppm HCl.

TABLE 4

Silane Blend Test Series: Data Summary

| MWR Solution | Application Rate of MWR (sq ft/gal) | Depth of MWR Penetration (inches) | 21 Day Immersion Test Wt. Gain (g.) | 21 Day Immersion Test % H₂O Excluded[1] | 63 Day Immersion Test Wt. Gain (g.) | 63 Day Immersion Test % H₂O Excluded[1] |
|---|---|---|---|---|---|---|
| Control | — | — | 4.64 | — | 4.95 | — |
| A. Sand Cement Treated[2] 24 HR After MWR Solution Preparation. | | | | | | |
| 1 | 377 | 0.0518 | 4.38 | 5.60 | 4.76 | 3.84 |
| 2 | 368 | 0.0498 | 2.45 | 47.11 | 3.90 | 21.21 |
| 3 | 349 | 0.0596 | 2.07 | 55.39 | 3.55 | 28.28 |
| 4 | 364 | 0.0489 | 1.96 | 57.84 | 3.40 | 31.31 |
| 5 | 361 | 0.0577 | 1.25 | 73.06 | 2.39 | 51.70 |
| B. Cubes Treated[2] After 7 Days Storage Of MWR Solutions At Ambient Conditions. | | | | | | |
| 1 | 371 | 0.0250 | 4.32 | 6.90 | 4.63 | 6.40 |
| 3 | 354 | 0.0742 | 1.94 | 58.20 | 3.25 | 34.40 |
| 5 | 369 | 0.0714 | 1.05 | 77.37 | 2.04 | 58.70 |
| C. Cubes Treated[2] After 7 Days Storage Of MWR Solutions. This set Of MWR Solutions Was Also Acid Equilibrated With HCl. | | | | | | |
| 1 | 336 | 0.0156 | 4.40 | 5.17 | 4.69 | 5.20 |
| 3 | 343 | 0.0615 | 1.69 | 63.75 | 3.11 | 37.10 |
| 5 | 330 | 0.0753 | 1.12 | 75.82 | 2.08 | 57.90 |
| D. Mineral Spirits Series, Sand Cement Cubes Treated 24 HR After MWR Solution Preparation. | | | | | | |
| 6 | 337 | 0.0890 | 1.69 | 64.05 | 2.39 | 51.71 |
| 7 | 312 | 0.0940 | 1.47 | 68.77 | 2.05 | 58.60 |
| 8 | 368 | 0.0938 | 1.03 | 77.84 | 1.61 | 67.40 |

[1]Exclusion value is relative to an untreated control.
[2]2 × 2" sand cement cubes immersed in the MWR solution for 15 seconds, allowed to drip for 15 seconds. Samples cured 14 days at 25° C., 50% RH prior to testing.

In Tables 2 through 4 there is set forth data resulting from extensive testing conducted for evaluation of certain blends of materials. For example, in Table 2 there is set forth a series of five solutions that were prepared being blends of methyltrimethoxysilane(MTM), isobutyltrimethoxysilane(IBTMS), and tetraisopropyltitanate(TIPT). These five solutions as set forth in Table 2 form the basic solutions from which three sub-sets of solutions were prepared and which are set forth in Table 4. Thus, in Table 4 a first sub-set of solutions is indicated at "A.1-5", and these particular solutions were not mixed with HCL so that no transalkoxylation of isopropanol (IPA) with the silane methoxy group would occur. Set "A" of the solutions was applied to concrete within twenty-four hours of preparation. Set "B.1,3,and 5" of solutions in Table 4 is the same three of the five solutions of Set "A" except that the samples in Set "B" were allowed to equilibrate at room temperature for seven days before they were applied to concrete. Set "C.1,3,and 5" of solutions in Table 4 again is the same three of the five Set "A" solutions except that the Set "C" solutions included HCL in order to facilitate transalkoxylation. The solutions of Set "C" were allowed seven days of equilibration prior to being tested. In Table 3 a series of three samples "6-8" were prepared as indicated, and this set is also shown in Table 4 as set "D.6-8". This Set "D" of solutions formed the basis os evaluations of the effects of employing mineral spirits in the formulations of the present invention in place of isopropanol(IPA) as the carrier for the silane. The tests conducted in order to compile the foregoing data set forth in Tables 2-4 were carried out using sand cement cubes rather than limestone since differences in performance are more apparent on sand than limestone, and solutions that rendered sub-par performance on sand would render even less performance on limestone. Data on the tests are summarized in Table 4, and particular note should be taken of the excellent performance of solution "D.7" which included a carrier combination of alcohol-mineral spirits-glycol ether. In Table 1 it is noted that the terms MANALOX®, ALUSEC™, and MANOSEC®, manufactured by Manchem Limited of London, England, appearing therein are trademarks covering proprietary catalytic compositions. In Table 3, the term Butyl CELLOSOLVE® is a trademark for ethylene glycol monobutyl ether.

TABLE 5

Surface Depositing Agents As Surface Water Beading Additives

| Beading Additive Type | % NVM Of Additive | Beading Test[2] On Concrete[3] Beading Performance 0.1% Level[1] | Beading Test[2] On Concrete[3] Beading Performance 1.0% Level[1] |
|---|---|---|---|
| Agent "a" | 100% | C | B |
| Agent "d" | 35 | B | A |
| Agent "b" | 50 | D | D |
| Agent "e" | 74 | D | D |
| Agent "c" | 5 | D | D |
| Agent "f" | 10 | D | C |
| Agent "g" | 10 | C | B |
| Agent "h" | 100 | D | D |
| Control[4] | — | D | D |

[1]WT % of beading additive added to total Control Solution. Sample solutions applied to concrete by dipping: 10 second immersion. Cure 36 hours at 25° C., 50% RH.
[2]A: No wetting after 120 min.
B: No wetting after 60 min.
C: No wetting after 30 min.
D: No wetting after 18 min.
[3]¾" × 1¼" × ¾" cut concrete.
[4]Isobutyltrimethoxysilane in isopropanol (IBTMS/IPA).

TABLE 6

Surface Depositing Agents:
Confirmation Of H$_2$O Beading Tests From Table 5

| MWR Composition[3] | | | | Beading Test: Time To Wetting[1] |
|---|---|---|---|---|
| IBTMS | IPA | Other Solvent[4] | Beading Agent | |
| 40[2] | 60 | — | — | <5 min. |
| 40 | — | 60 | — | 60+ |
| 35 | 60 | — | 5, Agent "d" | 60+ |
| 35 | 60 | — | 5, Agent "g" | 60+ |
| 36.5 | 60 | — | 3.5, TIPT | 60+ |
| 36.5 | 60 | — | 3.5, DBTDL | 60+ |
| Comparative Products | | | | |
| 40 | 60 (EtOH)[5] | — | — | 10 min |
| 35 | 60 (EtOH) | — | 5, Agent "d" | 60+ |
| 36.5 | 60 (EtOH) | — | 3.5, DBTDL | 60+ |

[1]Test Discontinued after 60 minutes.
[2]Control IBTMS/IPA
[3]2 × 2" sand cement cubes. Stored at laboratory ambient conditions for 7 days prior to treating. Cubes dipped into MWR solutions for 10 seconds to apply treatments, cured 4 HR at 25° C., 50% RH before testing for beading.
[4]Butyl Cellosolve ®
[5]Chemtrete ® From Trocal Division of Dynamit Nobel.

With reference now to Table 5, there is set forth therein data resulting from tests conducted with isopropanol solutions of isobutyltrimethoxysilane containing several beading agents. The beading agents used in these tests and set forth in Tables 5 and 6 which refer to them are set forth structurally and chemically as follows:

a. Dibutyltindilaurate (DBTDL)
b. H$_2$NCH$_2$CH$_2$NH(CH$_2$)$_3$Si(OMe)$_3$. An aminofunctional silane.
c. A fluorosilicone Fluid/1000 cps. of the formula:

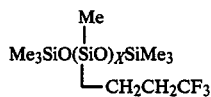

where X=10 to 100.
d. An amine salt functional siloxane copolymer.
e. Trimethylsilyl endcapped polysilicate.
f. An 800 dp polydimethylsiloxane fluid of the formula:

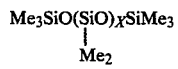

where X=0 to 800.
g. RTV (room temperature curable) silicone rubber.
h. (Me$_3$SiO)$_4$Si. Tetrakis(trimethylsiloxy)silane.

With respect to Table 5 it will be observed that beading Agents "d", dibutyltindilaurate, and "g" performed well. The results of Table 5 were confirmed by a series of further tests conducted with the confirming data being summarized in Table 6. In Table 6, the concluding tests indicated that not only were Agents "d", dibutyltindilaurate(DBTDL), and "g" good performers from the standpoint of beading and water shedding, but that in addition this capability was exhibited by tetraisopropyltitanate(TIPT). Table 6 and the tests conducted to establish this data also indicated that better beading and water shedding could be obtained by substituting a glycol ether solvent (Butyl Cellosolve ®) for isopropanol in the composition. A comparative material Chemtrete ® a forty percent solution of isobutyltrimethoxysilane in ethanol and a trademark of the Trocal Division of Dynamit Noble Aktiengesellschaft, Troisdorf, Germany, functioned in a fashion similar to the IBTMS/IPA control both in and out of the presence of beading agents. From the data available it is believed that levels of beading agent greater than one percent by weight will be required, and that levels of up to about fifteen percent can be employed for sand concrete, for example. With concrete, levels of from about ten to fifteen percent are preferred by weight, with combinations of beading agents being employed such as tetraisopropyltitanate(TIPT) with each of Agent "d" and dibutyltindilaurate(DBTDL). The most preferable combination has been found to be a formulation of by weight eighty-five percent isobutyltrimethoxysilane(IBTMS), ten percent tetraisopropyltitanate(TIPT), and five percent dibutyltindilaurate(DBTDL). Addition of beading and water shedding agents at levels of five to fifteen percent by weight are also contemplated herein.

The masonry water repellent(MWR) compositions of the present invention including their capability of water beading and surface water shedding have wide application including for example, concrete products such as precast products, blocks, brick, pipe, prestressed products, structural concrete, and highway surfacing; floor and wall tiles, roofing tile, and structural tiles; in Portland cement concrete work containing coarse limestone aggregate as footings, poured foundations, paving, steps, curbs, structural products, molded, reinforced, and prestressed concrete products such as blocks, bricks, pipes, panels, and beams; exterior and interior plaster; stucco; and terrazo.

As noted hereinbefore, alcohol solutions of alkylalkoxysilanes upon being applied to porous substrates such as masonry, both penetrate into the substrate and at the same time begin to evaporate from the surface of the masonry or concrete in substantial quantities. Thus, the amount of silane deposited in the masonry as a permanent water repellent is less than the amount of silane applied. Whether the alkylalkoxysilane is in an ethanol or isopropanol based carrier, the following transalkoxylation occurs in the system:

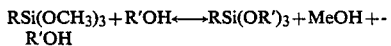

The resulting silane including a larger group R' is less mobile and less volatile, and the hydrolysis rate of RSi(OR')$_3$ decreases as the size of the R' group increases. Therefore, masonry water repellents of alkylalkoxysilanes in isopropanol carriers penetrate less into the porous substrate to which they are applied, hydrolyze slower, and evaporate less, than those masonry water repellents of alkylalkoxysilanes in ethanol carriers. In Table 8 below there is shown data from a series of tests conducted in order to affirm the foregoing.

TABLE 8

| | % MWR Absorbed Onto Concrete[3] and % H$_2$O Excluded by MWR Treatment | | | | | | |
|---|---|---|---|---|---|---|---|
| | MWR Composition[1] | | | | 24 HR Cure | 21 Day Immersion in H$_2$O Excluded | |
| MWR | IBTMS | TIPT | Agent "d" | DBTDL | % Of MWR Absorbed | H$_2$O absorbed (g) | % H$_2$O Excluded |
| 1 | 40 | — | — | — | 3% | 2.2 g | 53% |
| 2 | 40 | — | — | — | 18% | 2.7 g | 38% |

TABLE 8-continued

| | % MWR Absorbed Onto Concrete[3] and % H$_2$O Excluded by MWR Treatment | | | | | | |
|---|---|---|---|---|---|---|---|
| | MWR Composition[1] | | | | 24 HR Cure | 21 Day Immersion in H$_2$O Excluded | |
| MWR | IBTMS | TIPT | Agent "d" | DBTDL | % Of MWR Absorbed | H$_2$O absorbed (g) | % H$_2$O Excluded |
| | (Acidified) | | | | | | |
| 4 | 36 | | 4 | | 20% | 1.6 g | 64% |
| 5 | 36 | 4 | | | 34% | 1.6 g | 64% |
| 6 | 36 | | | 4 | 34% | 1.3 g | 70% |
| 7 | 36 | | 2 | 2 | 29% | 1.1 g | 75% |
| 8 | 36 | 2 | 2 | | 25% | 1.0 g | 77% |
| 9 | 36 | 2 | | 2 | 32% | 1.0 g | 77% |
| 3 | Chemtrete ® | | | | 13% | 2.3 g | 48% |
| C | Untreated Control | | | | — | 4.3 g | — |

[1]Solutions are 40% by wt (silane & additives) in isopropanol. Exception is Chemtrete ® (40% IBTMS in ethanol).
[2]% wt of theoretical hydrolysed MWR composition remaining on concrete.
[3]4" × 1¼" concrete; mixed aggegate with a high proportion of limestone aggregate. Application of MWR's to concrete by a 10 second dip. Cure 14 days at 25° C., 50% RH.

Figure 2:
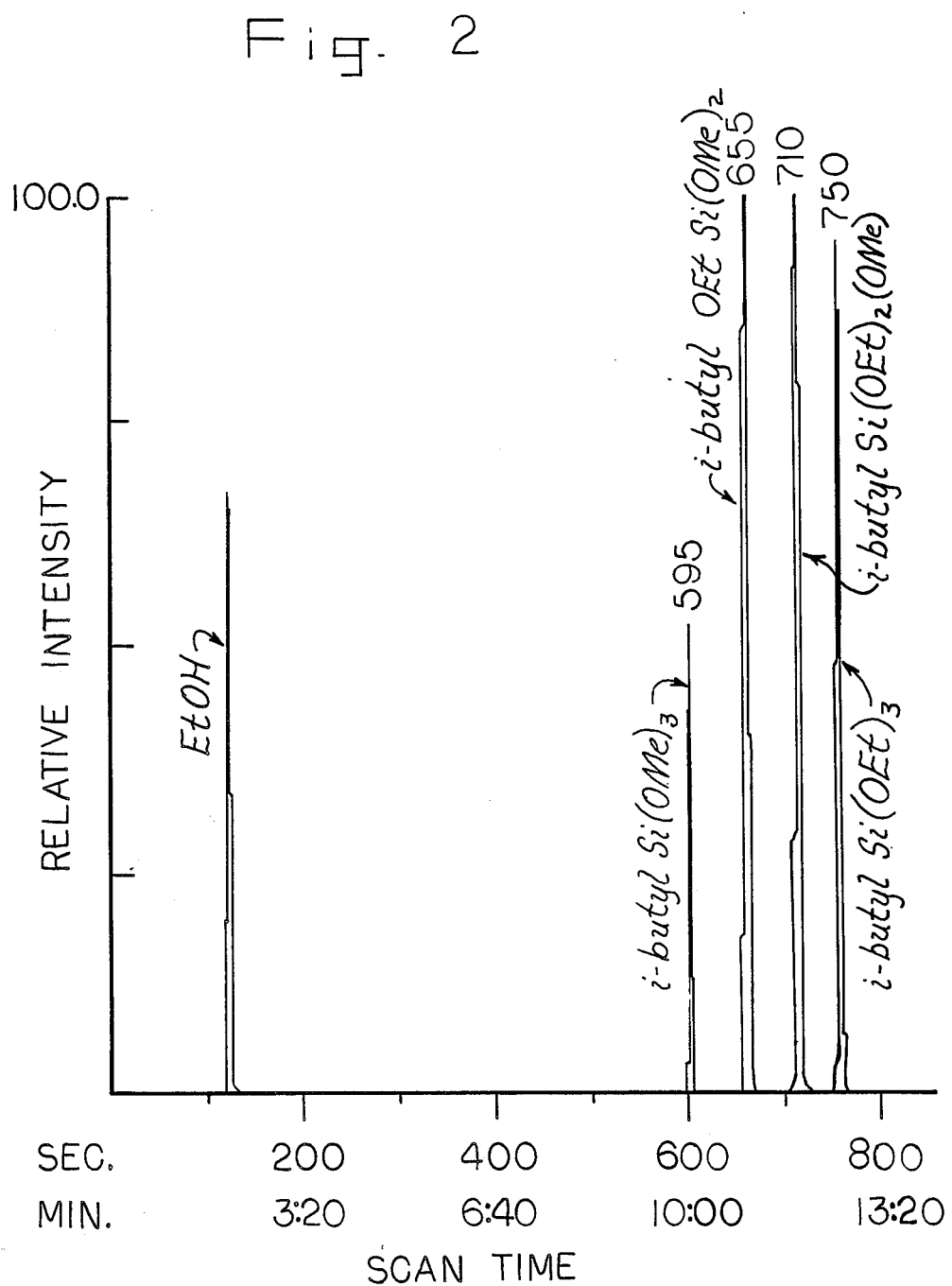
FIG. 2 is a representation of a gas chromatography-mass spectroscopy (GC-MS) trace of Chemtrete ® the ethanol based alkylalkoxysilane solution of FIG. 1.
Figure 3:
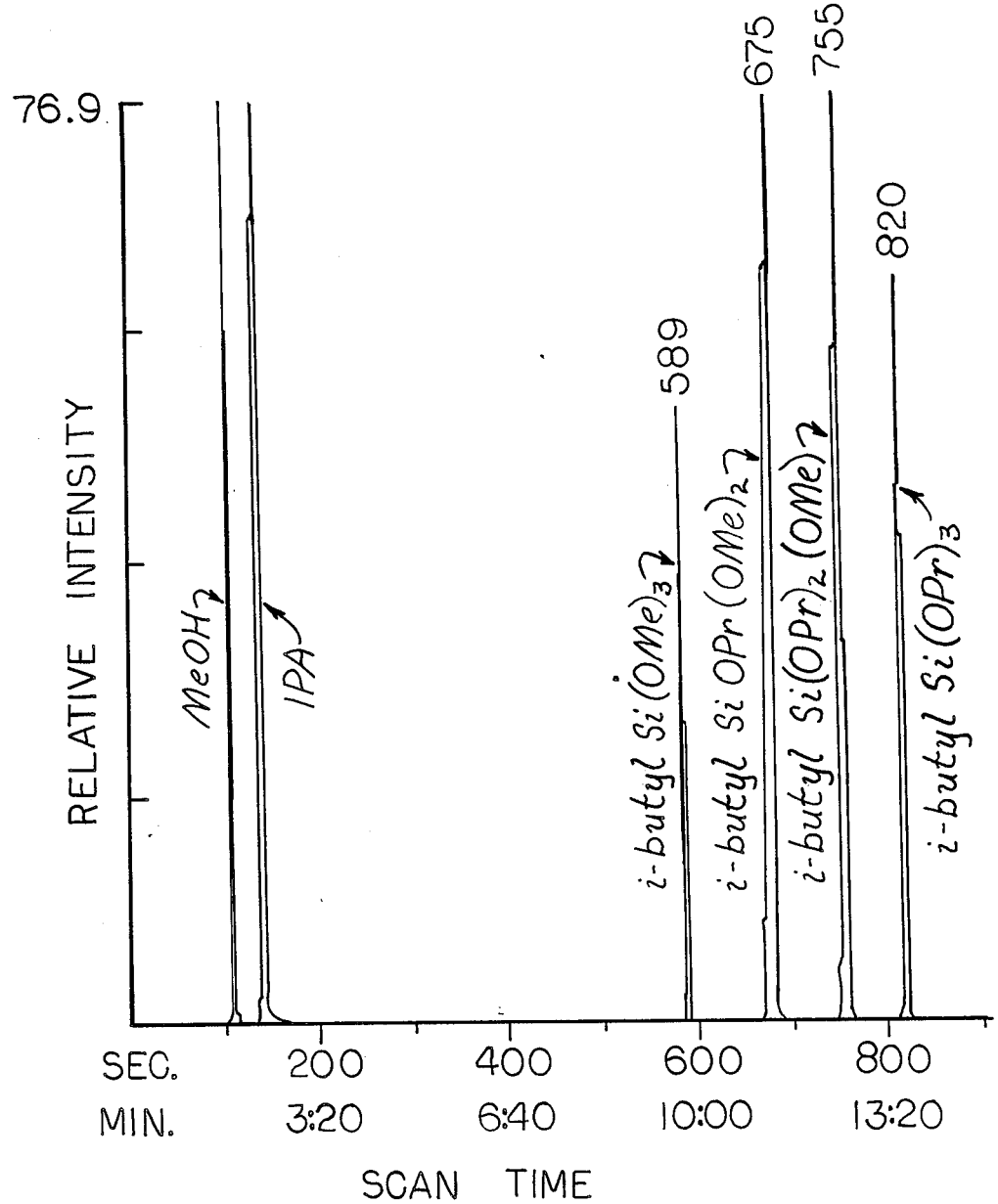
FIG. 3 is a representation of a GC-MS trace of the isopropoxylated alkylalkoxysilane based solution of FIG. 1.

From Table 8 it can be seen that alkylalkoxysilanes with isopropanol carriers deposit more of the silane onto the concrete substrate because of their lower volatility than do the ethanol based alkylalkoxysilane masonry water repellents. For example, in Table 8 masonry water repellent(MWR) No. 2 which was an acidified isobutyltrimethoxysilane(IBTMS) isopropanol alcohol solution deposited more of the silane into the concrete than did solutions Nos. 1 and 3. Solution Nos. 4–9 included various combinations of catalysts and surface depositing materials. Tetraisopropyltitanate(TIPT) increases the hydrolysis rate of the isobutyltrimethoxysilane and once this is initiated, the volatility of the hydrolyzed species is substantially reduced whereby the amount of the repellent absorbed by the concrete is increased. Dibutyltindilaurate(DBTDL) and the Agent "d" are each surface depositing agents which function to block the pores in the concrete and to enhance surface water beading. In theory, such materials, once they are deposited, also function to reduce the evaporation rate of any un-reacted isobutyltrimethoxysilane by sealing off the porous substrate surface rendering it more difficult for silanes to volatilize. Solution Nos. 7–9 are of particular interest wherein it can be seen that substantial quantities of water can be excluded by incorporating various combinations of specialized materials into the repellent composition. These Solution Nos. 7–9 provided much improved results compared to for example, Solution Nos. 1, 2, or 3, where specialized materials were omitted, with the exception of Solution No. 2 which had been acidified to include about ten parts per million of hydrochloric acid. Hence, the inclusion of specialized materials into the repellent compositions as outlined and illustrated above, improves both the amount of silane absorbed by the concrete as well as the percentage of the water excluded. In the absence of these specialized materials, silane absorption and water exclusion each decrease. A comparison of Solution Nos. 2 and 5 also reveals that tetraisopropyltitanate provided that a minimum of un-reacted alkoxy sites were present. In FIG. 1, a constant temperature was maintained during analysis, and isothermal TGA data confirmed the relative volatility of the masonry water repellent compositions, and shows that ethanol based solutions of isobutyltrimethoxysilane compositions evaporate faster than isopropanol based solutions of isobutyltrimethoxysilane compositions. This occurs because of the exchange of alkoxy groups (RO-) between the alkylalkoxysilane and the alcohol solvent. In fact, isopropoxylated isobutyltrimethoxysilanes evaporate to less than ten pecent of their original weight in about twice the time of the ethoxylated counterparts. From FIGS. 2 and 3, it can be seen that the isopropoxylated species possesses a much lower volatility than the ethoxylated counterpart by virtue of its longer elution times.

A further series of tests were conducted in order to determine the rate and the extent of the equilibriation of isobutyltrimethoxysilane/isopropanol solutions as a function of acid and water content. Accordingly, ten samples were prepared using three grades of isopropanol of differing water content followed by the addition of concentrated HCL or water where indicated. Table 9 shows the composition of each sample prepared, and the analysis of each sample for chloride, total hydroxide including water and alcohol, and iron can be seen in Table 10. The Table 11 there is set forth data from the gas-liquid chromatographic analysis of the various samples at intervals of one and eleven to fourteen days following the preparation of the sample.

TABLE 9

| Test Sample Compositions Analysis IBTMS Spiked W/0,10,20 ppm HCl and Diluted with Three (3) Grades of IPA | | | | | | | | |
|---|---|---|---|---|---|---|---|---|
| High Purity IPA 0.05% Wt H$_2$O | | | Low Water IPA 0.15% Wt H$_2$O | | | Plant Grade IPA 0.20% Wt H$_2$O | | |
| 1A | 1B | 1C | 2A | 2B | 2C | 3A | 3B | 3C |
| NIL | 10 | 20 | NIL | 10 | 20 | NIL | 10 | 20 |

TABLE 10

| | Analysis of Samples | | | | | | | | | |
|---|---|---|---|---|---|---|---|---|---|---|
| | 1A | 1B | 1C | 2A | 2B | 2C | 3A | 3B | 3C | 4B[1] |
| Cl$^-$ (ppm) | — | 10.5 | 54.2 | — | 29.2 | 32.0 | — | 13.2 | 50.0 | 13.2 |
| Total OH (Wt %) | 15.6 | 16.1 | 16.1 | 16.5 | 15.9 | 16.1 | 16.6 | 15.9 | 15.9 | 17.8 |
| Fe(ppm) | <1 | 2.0 | 14.0 | <1 | 2.0 | 7.0 | <1 | 4.0 | 14.0 | 4.0 |

[1]Duplicate of Sample 3B with 1.0% D.I. H$_2$O added.

TABLE 11
Transalkoxyation Data from GLC Analysis of IBTMS/IPA Solutions

| Sample No. | Age | IBTMS | IM$_2$iP$_1$[1] | IM$_2$iP$_2$ | IiP$_3$ | Dimers, Highers |
|---|---|---|---|---|---|---|
| No. Cl$^-$ Samples | | | | | | |
| 1A | 24 hours | 33.8 | | | | 2.4 |
|  | 14 days | 34.1 | <0.1 | | | 0.9 |
| 2A | 24 hours | 34.0 | | | | 0.9 |
|  | 14 days | 34.0 | <0.1 | <0.1 | | 0.9 |
| 3A | 24 hours | 34.2 | | | | 0.9 |
| 10 ppm Cl$^-$ Samples | | | | | | |
| 1B | 24 hours | 3.7 | 19.7 | 16.2 | 1.2 | 1.5 |
| 2B | 24 hours | 3.5 | 17.8 | 17.6 | 1.5 | 1.0 |
| 3B | 24 hours | 3.2 | 15.8 | 17.0 | 1.7 | 8.5 |
| 20 ppm Cl$^-$ Samples | | | | | | |
| 1C | 24 hours | 3.5 | 16.5 | 18.6 | 2.8 | 1.7 |
|  | 14 days | 3.4 | 15.5 | 18.3 | 3.5 | 1.3 |
| 2C | 24 hours | 3.4 | 16.6 | 18.5 | 2.3 | 1.2 |
|  | 12 days | 3.3 | 15.7 | 18.6 | 3.2 | 1.6 |
| 3C | 24 hours | 3.4 | 16.0 | 18.5 | 2.9 | 1.3 |
|  | 11 days | 3.3 | 15.5 | 18.1 | 3.7 | 3.1 |
| Additional 1% Addition of H$_2$O | | | | | | |
| 4B | 24 hours | 2.5 | 13.4 | 16.4 | 2.4 | 3.0 |

[1] I = Isobutyltrialkoxysilane; M = Methoxy; iP = Isopropoxy.

From the foregoing data it can be seen that by the addition of an acid, rapid equilibriation of isobutyltrimethoxysilane and isopropanol is caused to occur within twenty-four hours. Following the initial twenty-four hour aging period, the amount of un-reacted isobutyltrimethoxysilane remains constant, however. During the period from twenty-four hours to eleven days, the amount of tri-isopropoxylated silane increased at the expense of the mono-isopropoxylated silane. The di-substituted equilibriation product level remained unchanged. The addition of excess water in Sample No. 4B resulted in more of the isobutyltrimethoxysilane reacting during the first twenty-four hour period. After eleven days, the level of dimers and other higher weight species forming as a result of silane hydrolysis increased. The highest level of dimer formation in each set of samples can be found in acidified samples of each set where the amount of water added is the greatest, or Sample Nos. 3B, 3C, and 4B, for example. It is pointed out that in view of the above, the addition of chloride to repellent compositions will within twenty-four hours affect equilibriation of the solutions to a generally constant state. The volatility of the species deposited on the masonry will decrease, and therefore the evaporation of the silane will also decrease whereby the amount of the hydrolyzed silane deposited on the surface in turn increases. In compiling the previous data in Tables 9, 10, and 11, the weight percent of the isobutyltrimethoxysilane in the test solutions was forty percent. Concentrated hydrochloric acid was added to the solutions in Sample set B including 0.003 grams of concentrated acid per one hundred grams of isobutyltrimethoxysilane/isopropanol solution in order to provide a level of about ten parts per million of chloride concentration. Double this amount of acid was included in Sample set C in order to provide a chloride level of about twenty parts per million. With particular regard to Table 11, gas-liquid chromatographic data are reported as area percent so that the actual weight of each component is not calculated. A packed bed column was employed, and the conditions were fifty degrees centigrade for the initial oven temperature, with a four minute hold time. This was increased by fifteen degrees centigrade per minute to a final temperature of two hundred and eighty degrees centigrade without a hold time.

This application is related to a copending U.S. patent application Ser. No. 190,742, filed May 5, 1988, of Kenneth C. Fey et al, and assigned to the same assignee as the present application.

It will be apparent from the foregoing that many other variations and modifications may be made in the structures, compounds, compositions, and methods, described herein without departing substantially from the essential concepts of the present invention. Accordingly, it should be clearly understood that the forms of the invention described herein and set forth in the included Tables are exemplary only and are not intended as limitations on the scope of the present invention.

That which is claimed is:

1. A method of reducing the volatility and decreasing the evaporation loss of water repellent compositions containing a solution of an alkylalkoxysilane with $C_1$ to $C_6$ alkyl groups on silicon, or a blend of alkylalkoxysilanes each having $C_1$ to $C_6$ alkyl groups on silicon, and a carrier selected from the group consisting of (i) alcohols, (ii) mineral spirits, and (iii) glycol ethers, for application to a porous substrate, comprising adding to the solution at least one metal salt catalyst, and adding to the solution an effective amount of surface depositing water beading agent, the surface depositing water beading agent being selected from the group consisting of:

a.

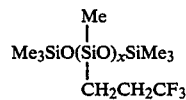

where X=10 to 100,
b. an amine salt functional siloxane copolymer,
c. trimethylsilyl endcapped polysilicate,
d.

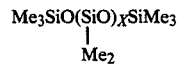

where x=0 to 800,
e. a room temperature curable silicone rubber, and
f. (Me$_3$SiO)$_4$Si.

2. The method of claim 1 including the step of acidifying the solution to a constant steady state condition.

3. The method of claim 2 including the step of maintaining the solution in a substantially anhydrous condition.

4. The method in claim 3 wherein the solution is acidified with hydrochloric acid.

5. The method of claim 4 wherein the acid is added to the solution to provide a concentration in the amount of about ten parts per million based on the weight of solution.

6. The method according to claim 5 wherein the metal salt catalyst is tetraisopropyltitanate.

7. The method according to claim 6 wherein the alkylalkoxysilane is present in an amount by weight of less than forty percent.

8. The method of claim 7 wherein the metal salt catalyst and the surface depositing agent constitute in combination by weight less than about five percent.

* * * * *